United States Patent
Yumoto

(10) Patent No.: US 7,497,970 B2
(45) Date of Patent: Mar. 3, 2009

(54) CHIRAL AGENT FOR LIQUID CRYSTAL, LIQUID CRYSTAL COMPOSITION AND POLYMER, AS WELL AS FILTER FOR OPTICAL RECORDING MEDIUM, OPTICAL RECORDING MEDIUM AND COLOR FILTER LIQUID FOR CRYSTAL

(75) Inventor: Masatoshi Yumoto, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 24 days.

(21) Appl. No.: 11/729,853

(22) Filed: Mar. 30, 2007

(65) Prior Publication Data
US 2007/0228325 A1 Oct. 4, 2007

(30) Foreign Application Priority Data
Mar. 30, 2006 (JP) ............................. 2006-095883

(51) Int. Cl.
| | |
|---|---|
| C09K 19/54 | (2006.01) |
| G11B 7/24 | (2006.01) |
| C08K 5/51 | (2006.01) |
| C08K 5/5399 | (2006.01) |
| G02F 1/133 | (2006.01) |

(52) U.S. Cl. ..................... 252/299.01; 430/1; 430/7; 430/20; 430/270.11; 430/281.1; 349/2; 349/106; 524/117; 524/148

(58) Field of Classification Search ............ 252/299.01, 252/299.2; 349/2, 104, 106; 430/20, 270.11, 430/1, 7, 281.1; 524/147, 117, 148; 562/10
See application file for complete search history.

(56) References Cited

FOREIGN PATENT DOCUMENTS

| | | |
|---|---|---|
| JP | 2002-123949 | 4/2002 |
| JP | 2002-180051 | 6/2002 |
| JP | 2004-265472 | 9/2004 |
| WO | WO 95/16007 | 6/1995 |

OTHER PUBLICATIONS

Wang et al., "Diastereoselective Synthesis of 1,1'-Binaphthyl-2,2'-diol", Journal of Organic Chemistry (1995), 60(22), 7364-5.*
Che et al., CA: 139: 350453, 2003.*
Kinderman et al, "C-C bond formation via N-phosphoryliminium ions", Synthesis (2004), (9), 1413-1418.*
Hulst et al., CA 124: 175073, 1995.*
Journal of Organic Chemistry, 56, 1991, 423.

* cited by examiner

Primary Examiner—Shean C Wu
(74) Attorney, Agent, or Firm—Sughrue Mion, PLLC

(57) ABSTRACT

The chiral agent used for liquid crystal according to the present invention comprises a phosphoric acid amide represented by General Formula (1) below:

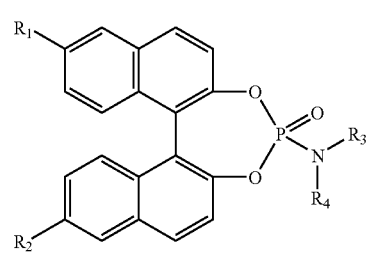

General Formula (1)

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

12 Claims, 1 Drawing Sheet

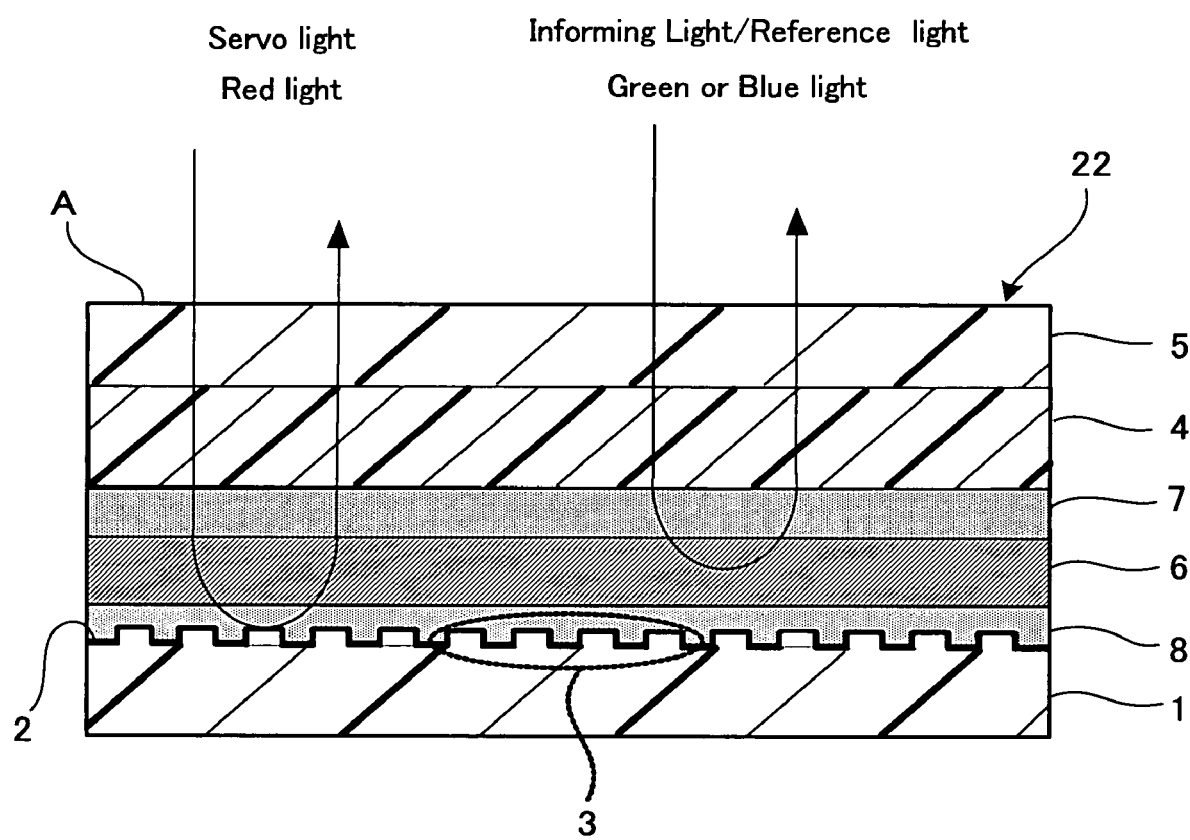

CHIRAL AGENT FOR LIQUID CRYSTAL, LIQUID CRYSTAL COMPOSITION AND POLYMER, AS WELL AS FILTER FOR OPTICAL RECORDING MEDIUM, OPTICAL RECORDING MEDIUM AND COLOR FILTER LIQUID FOR CRYSTAL

BACKGROUND OF THE INVENTION

1. Field of the Invention

The present invention relates to a chiral agent for liquid crystal, which has optical activity and causes a change in a structure of the liquid crystal; a liquid crystal composition containing the chiral agent for liquid crystal, and a polymer thereof; a filter for optical recording media, which can highly prevent the occurrence of noises; a hologram type optical recording medium capable of high-density recording using the filter for optical recording media; and a color filter for liquid crystal having high color purity.

2. Description of the Related Art

Cholesteric phase is one in which molecules of liquid crystal compounds are arranged in a helical structure, and can be formed by, for example, doping a nematic liquid crystal with a chiral compound. The liquid crystal in the cholesteric phase often shows chromatic interference effect through selective reflection of light having a fixed wavelength, due to the helical liquid crystal structure. The cholesteric phase having color rendering capability can be fixed by, for example, cooling the material to a temperature lower than the glass transition point or mixing the material into a network structure of polymer, thereby making it possible to use the material as an optical filter for a specific range of wavelengths, a colored coating agent, an interfering pigment or an optical film.

The wavelength at which the cholesteric liquid crystal phase formed from a nematic liquid crystal and a chiral compound demonstrates selective reflection can be set as required by controlling a liquid crystal twisting power of the chiral agent (HTP) and the amount of the chiral agent added. As such chiral agent, various compounds are disclosed (see, for example, German Patent Application No. 4342280 and Japanese Patent Application Laid-Open (JP-A) No. 2002-180051).

A proper chiral agent should have a twisting power high enough to induce the helical structure with a small amount of the chiral agent. The chiral agent should also have high compatibility with a liquid crystal compound, which enables effective interaction to occur between the components. Most of the conventional chiral agents of in the art are not sufficient with regard to these properties.

While Journal of Organic Chemistry, 56, 1991, 423 discloses bis-naphtol having a N-alkylphosphoric acid amide group, there are no cases reported on the use of bisnaphtol as a chiral agent for liquid crystal.

In recent years, much attention has been directed to hologram type optical recording media which are capable of recording information in a three-dimensional structure, as a recording medium which allows to write a large amount of information such as high-density image data.

The hologram type optical recording medium records information by superposing informing light which is modulated with a two-dimensional intensity distribution and reference light having intensity substantially equal to that of informing light within a photosensitive recording layer, and generating a distribution of optical property within the recording layer by using an interference pattern formed from informing light and reference light. To read (or reproduce) the written information, the recording layer is irradiated with only the reference light in a configuration similar to that of recording, so that such a reproduction light emerges from the recording layer which has intensity distribution corresponding to the distribution of optical property formed within the recording layer.

With the hologram type optical recording medium, since the distribution of optical property is formed in a three-dimensional configuration within the recording layer, multiplex recording is made possible in which a region where information is written by means of one informing light and another region where information is written by means of other informing light are partially superposed with each other. In case digital volume holography is employed, a very high signal-to-noise ratio (SN ratio) of one spot can be achieved, and therefore the original information can be reproduced with high fidelity, even when the SN ratio decreases somewhat due to the superposed recording. As a result, permissible number of multiplex recordings as large as several hundreds is made possible, thus resulting in a remarkable increase in the storage capacity of the optical recording medium (see JP-A No. 2002-123949).

The hologram type optical recording medium is exemplified by one shown in FIG. 1, which uses circularly polarized light for informing light and reference light and has such a constitution as a cholesteric liquid crystal layer or a dichroic mirror is disposed as a filter layer between a recording layer and a reflector film, and the recording layer and a servo layer are placed one on another (see JP-A No. 2004-265472).

The optical recording medium can be manufactured at a low cost in a large volume with high productivity, when the filter layer is constituted from a single-layer cholesteric liquid crystal layer which has helical structure of the same handedness as that of the circularly polarized light of the informing light. The filter layer constituted from this cholesteric liquid crystal layer has a sufficiently high reflectivity for writing light or reading light (wavelength 350 to 600 nm) which has circular polarization only, although the reflectivity decreases to as low as 20% when the recording system is changed to employ linearly polarized light or normal light, thus resulting in a larger proportion of light which leaks out.

To form a film compatible with the ordinary lens-based optics system by using the dichroic mirror, on the other hand, it is required to form 50 or more layers by vapor deposition which significantly increases the cost of manufacturing the optical recording medium.

As will be seen from the foregoing discussion, there has not been developed an efficient and low-cost method for mass production of hologram type optical recording medium which is capable of preventing random reflection of informing light and reference light on the reflector film of the optical recording medium, and preventing the occurrence of noises, and there is a pressing needs for such a method.

BRIEF SUMMARY OF THE INVENTION

The present invention aims to solve the problems described above in the prior art and to achieve the following objects. That is, it is an object of the present invention to provide a chiral agent for liquid crystal, which can impart a high twisting power to liquid crystalline compounds and is excellent in compatibility with liquid crystal compounds; a liquid crystal composition, a polymer and a liquid crystal color filter, which can provide hue having high color purity; a filter for optical recording media, which can prevent the occurrence of noises; and a hologram type optical recording medium capable of a high density recording using the filter for optical recording media.

The problems described above may be solved by the present invention as follows:

The chiral agent used for liquid crystal according to the present invention comprises a phosphoric acid amide represented by General Formula (1) below:

General Formula (1)

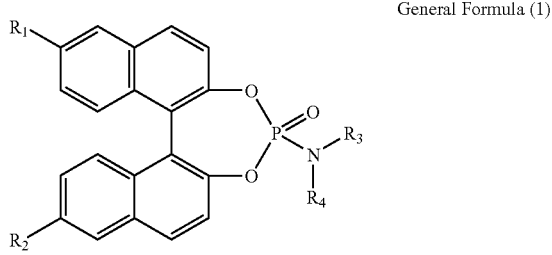

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

The chiral agent for liquid crystal according to the present invention is composed of a compound represented by General Formula (1) and is therefore excellent in compatibility with a liquid crystal compound and can impart a high twisting power to the liquid crystalline compound.

The liquid crystal composition according to the present invention comprises the chiral agent for liquid crystal according to the present invention and a liquid crystalline compound.

The liquid crystal composition according to the present invention contains the chiral agent for liquid crystal according to the present invention and therefore can provide hue having high color purity.

The polymer according to the present invention is obtained by polymerizing the liquid crystal composition according to the present invention.

The polymer according to the present invention is composed of the liquid crystal composition according to the present invention and is therefore excellent in productivity and can provide hue having high color purity, and also can be preferably used for a filter for optical recording media.

The filter for optical recording media according to the present invention contains the polymer according to the present invention.

The optical recording media according to the present invention contains the filter for optical recording media according to the present invention.

The optical recording medium according to the present invention contains the filter for optical recording media according to the present invention and therefore can provide an optical recording medium capable of recording image having a high density and various hues.

The color filter for liquid crystal according to the present invention comprises the chiral agent for liquid crystal according to the present invention.

The color filter for liquid crystal according to the present invention contains the chiral agent for liquid crystal according to the present invention and therefore can increase a twisting power (twisting angle) of a liquid crystal, and thus it is possible to enhance color purity of three primary colors of blue (B), green (G) and red (R), to improve selectivity and vividness of hue of a liquid crystal, and to provide a liquid crystal color filter capable of displaying vivid color images.

The color filter for liquid crystal according to the present invention contains the polymer according to the present invention.

The optical filter according to the present invention comprises the chiral agent for liquid crystal according to the present invention.

The optical filter according to the present invention comprises the chiral agent for liquid crystal according to the present invention and therefore it is possible to enhance color purity of three primary colors of blue (B), green (G) and red (R), to improve selectivity and vividness of hue of a liquid crystal, and to provide an optical filter capable of displaying clear and vivid color images.

BRIEF DESCRIPTION OF THE SEVERAL VIEWS OF THE DRAWING

FIG. 1 is a schematic sectional view showing exemplarily an optical recording medium according to the present invention.

DETAILED DESCRIPTION OF THE INVENTION

Chiral Agent for Liquid Crystal

The chiral agent for liquid crystal according to the present invention comprises a phosphoric acid amide represented by General Formula (1) and optional other chiral agents as required.

The chiral agent for liquid crystal has a property capable of imparting a helical twisting power (HTP) to the liquid crystal. That is, the chiral agent is a compound that provides a liquid crystal compound, preferably a nematic liquid crystal compound with a twisting power to induce a helical structure thereof. The site in a molecular structure unit required to the chiral agent is a chiral site, for example.

The HTP described above means a twisting power having a helical structure of a liquid crystal, that is, HTP=1/(pitch× concentration of chiral agent [weight fraction]). The HTP can be determined, for example, by measuring a helical pitch (period of helical structure; μm) of a liquid crystal molecule at a certain temperature and converting the resulting value in terms of the concentration of a chiral agent ($\mu m^{-1}$).

The chiral agent for liquid crystal according to the present invention comprises a phosphoric acid amide represented by General Formula (1) and is therefore excellent in compatibility with a liquid crystalline compound and can efficiently impart a twisting power to a helical structure of a liquid crystal.

Phosphoric Acid Amide

The phosphoric acid amide is represented by the following General Formula (1):

General Formula (1)

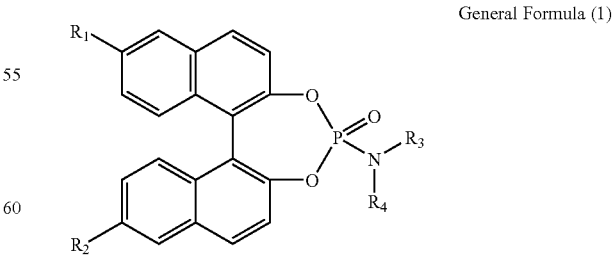

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

The halogen atom in $R_1$ and $R_2$ is preferably a fluorine atom, a chlorine atom or a bromine atom, and more preferably a bromine atom.

The number of carbon atoms in the alkyl group of $R_1$ and $R_2$ is preferably from 1 to 30, and more preferably from 1 to 20.

The alkyl group may be further substituted with a substituent. For example, the substituent is preferably a halogen atom, an aryl group, an alkenyl group, an alkynyl group, an alkoxy group, an acyl group, an alkoxycarbonyl group, an aryloxycarbonyl group, an acyloxy group or a cyano group, and more preferably a halogen atom, an alkoxy group or an acyloxy group.

Specific examples of the alkyl group include methyl group, pentyl group, cyclohexyl group, trifluoromethyl group, benzyl group, allyl group, methoxyethyl group and acetyloxyethyl group.

The number of carbon atoms of the aryl group in $R_1$ and $R_2$ is preferably from 4 to 40, and more preferably from 4 to 30.

The aryl group may be further substituted with a substituent. For example, the substituent is preferably a halogen atom, an alkyl group, an alkenyl group, an alkynyl group, an alkoxy group, an acyl group, an alkoxycarbonyl group, an aryloxycarbonyl group, an acyloxy group or a cyano group, and more preferably a halogen atom, an alkyl group, an alkenyl group, an alkoxy group or an acyloxy group.

The aryl group may be a heterocycle. For example, the heterocycle is preferably a pyridine ring, a pyrimidine ring, a furan ring or a benzofuran ring, and more preferably a pyridine ring or a pyrimidine ring.

Specific examples of the aryl group include phenyl group, β-naphthyl group, 4-methylphenyl group, 4-vinylphenyl group, 4-butyloxyphenyl group, 4-benzoyloxyphenyl group and pyrimidin-2-yl group.

The number of carbon atoms of the alkenyl group in $R_1$ and $R_2$ is preferably from 2 to 30, and more preferably from 2 to 20.

The alkenyl group may be substituted with a substituent. For example, the substituent is preferably a halogen atom, an aryl group, an alkoxy group, an acyl group, an alkoxycarbonyl group, an aryloxycarbonyl group, an acyloxy group, a cyano group, and more preferably an aryl group, an alkoxycarbonyl group, an aryloxycarbonyl group or a cyano group.

Specific examples of the alkenyl group include vinyl group, 2-phenylethenyl group, 1-phenylethenyl group, 2-(4-acetyloxyphenyl)ethenyl group, 2-ethoxycarbonylethenyl group, 2-phenoxycarbonylethenyl group, 2,2-di(methoxycarbonyl)ethenyl group and 2-cyano-2-ethoxycarbonylethenyl group.

The number of carbon atoms of the alkynyl group in $R_1$ and $R_2$ is preferably from 2 to 30, and more preferably from 2 to 20.

The alkynyl group may be substituted with a substituent. For example, the substituent is preferably a halogen atom, an aryl group, an alkenyl group, an alkoxy group, an acyl group, an alkoxycarbonyl group, an aryloxycarbonyl group, an acyloxy group or a cyano group, and more preferably an aryl group or an acyloxy group.

Specific examples of the alkynyl group include ethynyl group, phenylethynyl group and 4-acetyloxyphenylethynyl group.

The number of carbon atoms of the alkoxy group in $R_1$ and $R_2$ is preferably from 1 to 30, and more preferably from 1 to 20.

The alkoxy group may be substituted with a substituent. For example, the substituent is preferably a halogen atom, an aryl group, an alkenyl group, an alkynyl group, an alkoxy group, an acyl group, an alkoxycarbonyl group, an aryloxycarbonyl group, an acyloxy group or a cyano group, and more preferably a halogen atom, an alkoxy group or an acyloxy group.

Specific examples of the alkoxy group include methoxy group, pentyloxy group, benzyloxy group, allyloxy group, methoxyethoxy group and acetyloxyethoxy group.

$R_1$ and $R_2$ preferably represent a hydrogen atom, a halogen atom or an alkenyl group, and more preferably hydrogen atom.

The number of carbon atoms of the alkyl group in $R_3$ is preferably from 1 to 30, and more preferably from 1 to 20.

The alkyl group may be substituted with a substituent. For example, the substituent is preferably a halogen atom, an aryl group, an alkenyl group, an alkynyl group, an alkoxy group, an acyl group, an alkoxycarbonyl group, an aryloxycarbonyl group, an acyloxy group or a cyano group, and more preferably a halogen atom, an alkoxy group or an acyloxy group.

Specific examples of the alkyl group include a methyl group, a pentyl group, a cyclohexyl group, a trifluoromethyl group, a benzyl group, an allyl group, a methoxyethyl group and an acetyloxyethyl group.

The number of carbon atoms of the aryl group in $R_3$ is preferably from 4 to 40, and more preferably from 4 to 30.

The aryl group may be substituted with a substituent. For example, the substituent is preferably a halogen atom, an alkyl group, an alkenyl group, an alkynyl group, an alkoxy group, an acyl group, an alkoxycarbonyl group, an aryloxycarbonyl group, an acyloxy group, a cyano group or a hydroxyl group, and more preferably a halogen atom, an alkyl group, an alkenyl group, an alkoxy group, an acyloxy group or a hydroxyl group.

The aryl group may be a heterocycle. The heterocycle is preferably a pyridine ring, a pyrimidine ring, a furan ring or a benzofuran ring, and more preferably a pyridine ring or a pyrimidine ring.

Specific examples of the aryl group include phenyl group, β-naphthyl group, 4-methylphenyl group, 4-vinylphenyl group, 4-butyloxyphenyl group, 4-benzoyloxyphenyl group and pyrimidin-2-yl group.

The alkyl group in $R_4$ includes the same alkyl group as in $R_3$.

The aryl group in $R_4$ includes the same aryl group as in $R_4$.

Either $R_3$ or $R_4$ is preferably a hydrogen atom.

The alkyl group, the aryl group, the alkenyl group and the alkynyl group in $R_1$ and $R_2$, and the alkyl group and the aryl group in $R_3$ and $R_4$ may be substituted with substituents represented by the following General Formulas (4) to (7):

General Formula (4)

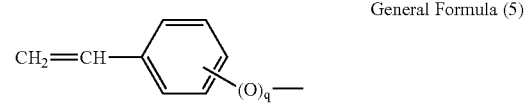

General Formula (5)

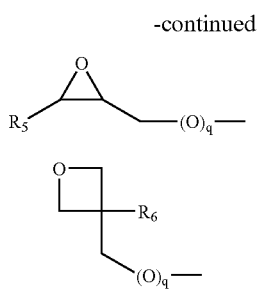

General Formula (6)

General Formula (7)

In General Formulas (4) to (7), W represents either a hydrogen atom or a methyl group, T represents either —O— or —NR$_7$—, R$_5$ represents either a hydrogen atom or an alkyl group, R$_6$ represents an alkyl group, R$_7$ represents either a hydrogen atom or an alkyl group, and q represents an integer of 0 or 1.

The number of carbon atoms of the alkyl group in R$_5$ is preferably from 1 to 20, and more preferably from 1 to 12.

The alkyl group may be substituted with a substituent. The substituent includes, for example, an aryl group and an alkoxy group.

The alkyl group in R$_6$ is preferably a non-substituted alkyl group, and examples thereof include methyl group and ethyl group.

The number of carbon atoms of the alkyl group in R$_7$ is preferably from 1 to 20, and more preferably from 1 to 12.

The alkyl group may be substituted with a substituent. The substituent includes, for example, an aryl group and an alkoxy group.

The substituent represented by any one of General Formulas (4) to (7) is preferably a substituent represented by General Formula (4) or (5). Specifically, the substituent is preferably an acryloyloxy group, a methacryloyloxy group, an N-acryloylcarbamoyl group or an N-acryloyl-N-alkylcarbamoyl group.

Specific examples of the phosphoric acid amide represented by General Formula (1) include the following compounds Nos. 1-1 to 1-33 and Nos. 2-1 to 2-42. The phosphoric acid amide represented by General Formula (1) is not limited thereto.

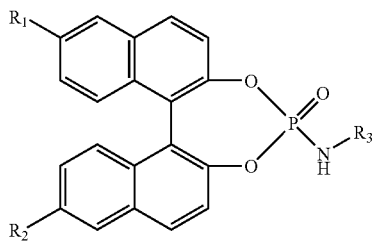

| No. | —R$_1$ | —R$_2$ | —R$_3$ | Axial Asymmetry of Binaphthyl |
|---|---|---|---|---|
| 1-1 | —H | —H | —C$_6$H$_5$ | (S) |
| 1-2 | —H | —H | —C$_6$H$_4$—C$_4$H$_9{}^n$ | (R) |
| 1-3 | —H | —H | —C$_6$H$_4$—OMe | (R) |
| 1-4 | —H | —H | —C$_6$H$_4$—F (ortho) | (R) |
| 1-5 | —H | —H | —C$_6$H$_4$—OH | (R) |
| 1-6 | —H | —H | —C$_6$H$_4$—CH=CH—COOMe | (S) |

-continued
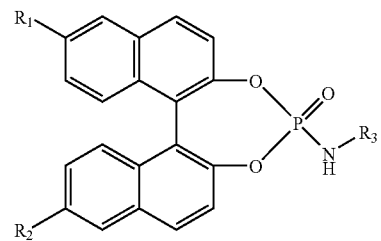
| No. | —R₁ | —R₂ | —R₃ | Axial Asymmetry of Binaphthyl |
|---|---|---|---|---|
| 1-7 | —H | —H | 4-(acryloyloxy)phenyl | (R) |
| 1-8 | —H | —H | 4-(4-(acryloyloxy)butoxy)phenyl | (R) |
| 1-9 | —H | —H | 4-(4-(methacryloyloxy)butoxy)phenyl | (S) |
| 1-10 | —H | —H | pyridin-2-yl | (S) |
| 1-11 | —H | —H | 4-(phenylethynyl)phenyl | (R) |
| 1-12 | —H | —H | 4-cyanophenyl | (S) |
| 1-13 | —H | —H | 4-(ethoxycarbonyl)phenyl | (R) |
| 1-14 | —H | —H | 4-((4-(n-pentyloxy)phenoxy)carbonyl)phenyl (—COO—C₆H₄—OC₅H₁₁ⁿ) | (S) |
| 1-15 | —H | —H | 4-((6-(acryloyloxy)hexyloxy)carbonyl)phenyl | (S) |
| 1-16 | —H | —H | 4-((4-vinylbenzyl)oxy)phenyl | (R) |

-continued

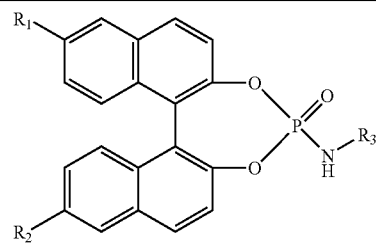

| No. | —R$_1$ | —R$_2$ | —R$_3$ | Axial Asymmetry of Binaphthyl |
|---|---|---|---|---|
| 1-17 | —H | —H | 4-(glycidyloxy)phenyl-methyl | (R) |
| 1-18 | —H | —H | 4-((3-ethyloxetan-3-yl)methoxy)phenyl-methyl | (S) |
| 1-19 | —Br | —Br | phenyl | (S) |
| 1-20 | —OC$_5$H$_{11}$$^n$ | —OC$_5$H$_{11}$$^n$ | 4-Me-phenyl | (R) |
| 1-21 | —CH=CH—COOEt | —CH=CH—COOEt | 4-F-phenyl | (S) |
| 1-22 | —CH=CH—COOEt | —Br | 4-OEt-phenyl | (R) |
| 1-23 | —CH=CH—COOMe | —CH=CH—COOEt | phenyl | (S) |
| 1-24 | —C≡C—phenyl | —C≡C—phenyl | 4-(COO—(CH$_2$)$_6$—OCOCH=CH$_2$)-phenyl | (S) |
| 1-25 | —CH=CH—CN | —CH=CH—CN | phenyl | (R) |
| 1-26 | —CH=CH—phenyl | —CH=CH—phenyl | phenyl | (R) |
| 1-27 | —CH=CH—COO—(CH$_2$)$_2$—OCOCH=CH$_2$ | —R$_1$ | phenyl | (S) |

-continued

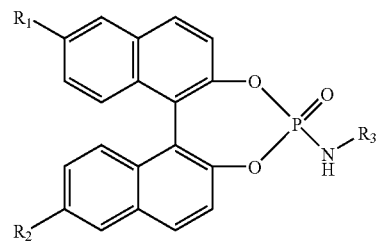

| No. | —R$_1$ | —R$_2$ | —R$_3$ | Axial Asymmetry of Binaphthyl |
|---|---|---|---|---|
| 1-28 | -CH$_2$CH$_2$-COO-(CH$_2$)$_2$-O-CO-CH=CH$_2$ | —R$_1$ | phenyl | (R) |
| 1-29 | p-tolyl | —R$_1$ | phenyl | (S) |
| 1-30 | p-tolyl | —R$_1$ | 4-CH$_3$-C$_6$H$_4$-O-(CH$_2$)$_4$-O-CO-CH=CH$_2$ | (R) |
| 1-31 | 4-CH$_3$-C$_6$H$_4$-O-(CH$_2$)$_4$-O-CO-CH=CH$_2$ | —R$_1$ | phenyl | (S) |
| 1-32 | HC≡C-CH$_2$-O-CO-CH=CH$_2$ | —R$_1$ | phenyl | (S) |
| 1-33 | CH$_3$-CH=CH-CH$_2$-O-CO-CH=CH$_2$ | —R$_1$ | phenyl | (R) |

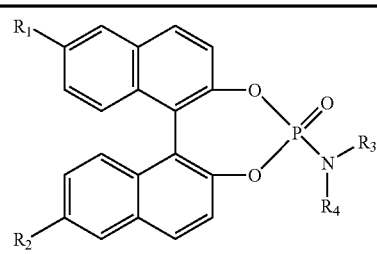

| No. | —R$_1$ | —R$_2$ | —R$_3$ | —R$_4$ | Axial Asymmetry of Binaphthyl |
|---|---|---|---|---|---|
| 2-1 | —H | —H | —C$_3$H$_7{}^n$ | —H | (S) |
| 2-2 | —H | —H | —C$_6$H$_{13}{}^n$ | —H | (R) |
| 2-3 | —H | —H | —C$_{18}$H$_{37}{}^n$ | —H | (S) |

-continued

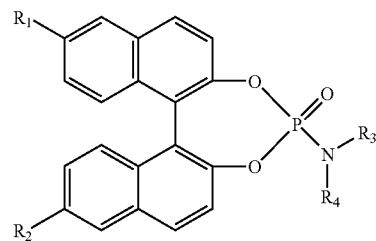

| No. | —R$_1$ | —R$_2$ | —R$_3$ | —R$_4$ | Axial Asymmetry of Bi-naphthyl |
|---|---|---|---|---|---|
| 2-4 | —H | —H | —C$_6$H$_{10}$CH$_3$ (methylcyclohexyl) | —H | (R) |
| 2-5 | —H | —H | —CH$_2$CH$_2$CF$_3$ | —H | (S) |
| 2-6 | —H | —H | —CH$_2$—C$_6$H$_5$ | —H | (S) |
| 2-7 | —H | —H | —CH$_2$—CH=CH$_2$ | —H | (R) |
| 2-8 | —H | —H | —CH$_2$CH$_2$OMe | —H | (R) |
| 2-9 | —H | —H | —CH$_2$CH$_2$OCH$_2$C≡CH | —H | (S) |
| 2-10 | —H | —H | —CH$_2$COOMe | —H | (S) |
| 2-11 | —H | —H | —CH$_2$CH$_2$COOCH$_2$—C$_6$H$_5$ | —H | (R) |
| 2-12 | —H | —H | —CH$_2$CH$_2$COOH | —H | (R) |
| 2-13 | —H | —H | —(CH$_2$)$_2$COO(CH$_2$)$_2$OC(O)CH=CH$_2$ | —H | (R) |
| 2-14 | —H | —H | —(CH$_2$)$_5$OC(O)CH=CH$_2$ | —H | (R) |
| 2-15 | —H | —H | —(CH$_2$)$_{11}$COO—C$_6$H$_5$ | —H | (S) |
| 2-16 | —H | —H | —(CH$_2$)$_2$OCH$_2$—C$_6$H$_4$—CH=CH$_2$ | —H | (R) |
| 2-17 | —H | —H | —(CH$_2$)$_3$O—CH$_2$-(glycidyl/oxiranyl) | —H | (R) |
| 2-18 | —H | —H | —(CH$_2$)$_3$O—CH$_2$-(3-ethyloxetanyl) | —H | (S) |

-continued

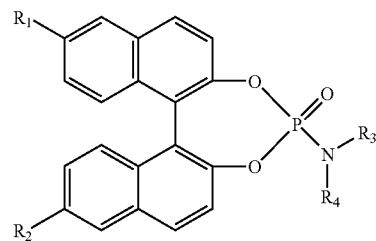

| No. | —R$_1$ | —R$_2$ | —R$_3$ | —R$_4$ | Axial Asymmetry of Bi-naphthyl |
|---|---|---|---|---|---|
| 2-19 | —H | —H | —C$_3$H$_7^n$ | —C$_3$H$_7^n$ | (S) |
| 2-20 | —H | —H | —C$_6$H$_{13}^n$ | —C$_6$H$_{13}^n$ | (R) |
| 2-21 | —H | —H | —C$_{18}$H$_{37}^n$ | —Me | (S) |
| 2-22 | —H | —H | —CH$_2$CH=CH$_2$ | —CH$_2$CH=CH$_2$ | (R) |
| 2-23 | —H | —H | —(CH$_2$)$_6$O(C=O)CH=CH$_2$ | —(CH$_2$)$_6$O(C=O)CH=CH$_2$ | (S) |
| 2-24 | —H | —H | —(CH$_2$)$_6$O(C=O)CH=CH$_2$ | —Me | (S) |
| 2-25 | —H | —H | —C$_6$H$_4$-CH$_3$ (phenyl) | —Me | (R) |
| 2-26 | —H | —H | —C$_6$H$_4$-OC$_3$H$_7^n$ | —Me | (R) |
| 2-27 | —H | —H | —(CH$_2$)$_2$OMe | —(CH$_2$)$_2$OMe | (S) |
| 2-28 | —Br | —Br | —C$_3$H$_7^n$ | —H | (S) |
| 2-29 | —OC$_5$H$_{11}^n$ | —OC$_5$H$_{11}^n$ | —C$_6$H$_{13}^n$ | —H | (R) |
| 2-30 | —CH=CH-COOEt | —CH=CH-COOEt | —C$_{18}$H$_{37}^n$ | —Me | (S) |
| 2-31 | —CH=CH-COOEt | —Br | —cyclohexyl | —H | (R) |
| 2-32 | —CH=CH-COOMe | —CH=CH-COOEt | —(CH$_2$)$_6$O(C=O)CH=CH$_2$ | —H | (S) |
| 2-33 | —C≡C-C$_6$H$_5$ | —C≡C-C$_6$H$_5$ | —(CH$_2$)$_6$O(C=O)CH=CH$_2$ | —Me | (S) |
| 2-34 | —CH=CH-CN | —CH=CH-CN | —CH$_2$—CH=CH$_2$ | —H | (R) |
| 2-35 | —CH=CH-C$_6$H$_5$ | —CH=CH-C$_6$H$_5$ | —CH$_2$CH$_2$OMe | —H | (R) |

-continued

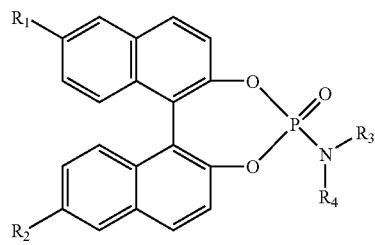

| No. | —R₁ | —R₂ | —R₃ | —R₄ | Axial Asymmetry of Binaphthyl |
|---|---|---|---|---|---|
| 2-36 | -CH=CH-COO-(CH₂)₂-O-C(=O)-CH=CH₂ | —R₁ | —$C_3H_7{}^n$ | —H | (S) |
| 2-37 | -CH₂CH₂-COO-(CH₂)₂-O-C(=O)-CH=CH₂ | —R₁ | —$C_6H_{13}{}^n$ | —H | (R) |
| 2-38 | -C₆H₄-CH₃ | —R₁ | —$C_{12}H_{25}{}^n$ | —H | (S) |
| 2-39 | -C₆H₄-CH₃ | —R₁ | —(CH₂)₆O-C(=O)-CH=CH₂ | —H | (R) |
| 2-40 | -C₆H₄-O-(CH₂)₄-O-C(=O)-CH=CH₂ | —R₁ | —$C_6H_{13}{}^n$ | —H | (S) |
| 2-41 | -C≡C-CH₂-O-C(=O)-CH=CH₂ | —R₁ | —$C_6H_{13}{}^n$ | —H | (S) |
| 2-42 | -CH=CH-CH₂-O-C(=O)-CH=CH₂ | —R₁ | —$C_6H_{13}{}^n$ | —H | (R) |

In Nos. 1-1 to 1-33 and Nos. 2-1 to 242, $C_3H_7{}^n$ represents a normal propyl group, $C_4H_9{}^n$ represents a normal butyl group, $C_5H_{11}{}^n$ represents a normal pentyl group, $C_6H_{13}{}^n$ represents a normal hexyl group, $C_{12}H_{25}{}^n$ represents a normal dodecyl group, $C_{18}H_{37}{}^n$ represents a normal octadecyl group, Me represents a methyl group, and Et represents an ethyl group.

The method for identification of a phosphoric acid amide represented by General Formula (1) is not specifically limited and can be appropriately selected from known methods and examples thereof include methods using ¹H-NMR spectrum and UV-vis absorption spectrum.

Method for Preparation of Phosphoric Acid Amide

The method for preparation of a phosphoric acid amide represented by General Formula (1) is one for reacting a compound represented by General Formula (2) below with a compound represented by General Formula (3) below.

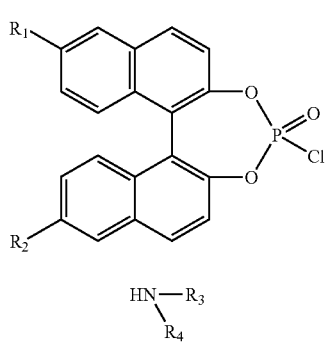

General Formula (2)

General Formula (3)

In General Formula (2), $R_1$ and $R_2$ may be identical or different and each represents a hydrogen atom, a halogen atom, an alkyl group, an aryl group, an alkenyl group, an alkynyl group or an alkoxy group, and the binaphthyl structure has an axial asymmetry of either (R) or (S).

In General Formula (3), $R_3$ and $R_4$ may be identical or different and each represents a hydrogen atom, an alkyl group or an aryl group.

The phosphoric acid amide used in the chiral agent for liquid crystal according to the present invention can be prepared by a method represented by the following reaction scheme (1).

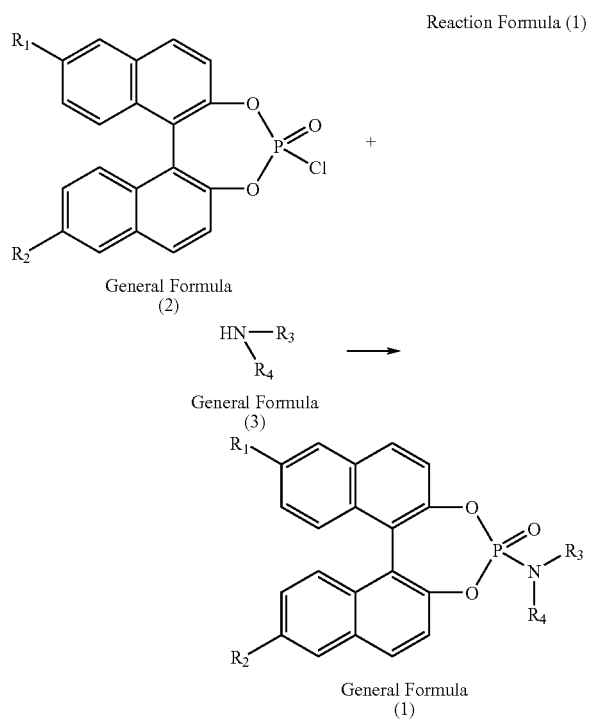

Reaction Formula (1)

In General Formulas (1) to (3), the binaphthyl structure represents an axial asymmetry of either (R) or (S), $R_1$ and $R_2$ may be identical or different and each represents a hydrogen atom, a halogen atom, an alkyl group, an aryl group, an alkenyl group, an alkynyl group or an alkoxy group, and $R_3$ and $R_4$ may be identical or different and each represents a hydrogen atom, an alkyl group or an aryl group.

The compound represented by General Formula (2) is not specifically limited and can be appropriately selected from known compounds.

The method for preparation of a compound represented by General Formula (2) is not specifically limited and can be appropriately selected from known methods, and examples thereof include a method described in "Fine Organic Synthesis, Revised Second Edition (Nankodo Co., Ltd., 1995, p. 461)".

The compound represented by General Formula (3) is not specifically limited and can be appropriately selected from known compounds.

The compound represented by General Formula (2) is preferably reacted with the compound represented by General Formula (3) under the reaction conditions at a temperature of 20° C. to 100° C. for 0.5 to 8 hours, and more preferably at 25° C. to 60° C. for 1 to 4 hours. Under the reaction conditions, when the temperature is higher than 100° C., the product may be decomposed, occasionally.

The amount of the compound represented by General Formula (3) to be added is preferably from 1.0 to 5.0 moles, and more preferably from 1.0 to 2.0 moles based on 1 mol of the compound represented by General Formula (2). When the amount is from 1.0 to 5.0 moles, the reaction quickly proceeds.

The compound represented by General Formula (2) is preferably reacted with the compound represented by General Formula (3) using a solvent.

The solvent is preferably an aprotic organic solvent or a solvent having a boiling point of 150° C. or lower.

When either $R^3$ or $R^4$ is an aryl group in the phosphoric acid amide represented by General Formula (1), a dielectric constant of the solvent is preferably 45 or more, and more preferably 50 or more. When the dielectric constant is less than 45, the reaction may not proceed, occasionally.

Examples of the solvent having the dielectric constant of 45 or more include ethylene carbonate (dielectric constant: 90) and propylene carbonate (dielectric constant: 65).

The amount of the solvent to be added is preferably from 0.3 to 3.0 L, and more preferably from 0.5 to 2 L, based on 1 mol of the compound represented by General Formula (2). When the amount is from 0.3 to 3.0 L, stirring ability may become excellent.

The compound represented by General Formula (2) is preferably reacted with the compound represented by General Formula (3) using a base.

The base is preferably an organic base. When the base is an organic base, the reaction system becomes uniform and it is possible to make control of the reaction easier.

Examples of the organic base include pyridine, triethylamine, lutidine and N-methylmorpholine.

The amount of the base to be added is preferably from 1.0 to 2.0 moles, and more preferably from 1.0 to 1.2 moles based on 1 mol of the compound represented by General Formula (2). When the amount is from 1.0 to 2.0 moles, the reaction may proceed satisfactorily, occasionally.

When $R_3$ is an aryl or alkyl group which is substituted with a substituent in General Formula (1), it is possible to obtain a compound wherein $R_3$ is aryl or alkyl group which is substituted with a substituent in General Formula (1) by reacting the compound represented by General Formula (2) with the compound represented by General Formula (3) to form a phosphoric acid amide skeleton, followed by a functional group conversion reaction to obtain a compound wherein $R_3$ in General Formula (1) is an aryl or alkyl group substituted with a substituent.

Such a functional group conversion reaction is not specifically limited and can be 1,5 appropriately selected from known functional group conversion reactions, and examples thereof include esterification reaction and amidation reaction.

Also, the method for preparation of the phosphoric acid amide represented by General Formula (1) includes, for example, a method described in Journal of Organic Chemistry, 56, 1991, 423.

The phosphoric acid amide represented by General Formula (1) preferably has a structure having one or more polymerizable groups introduced therein. When the phosphoric acid amide has a structure having one or more polymerizable groups introduced therein, it is possible to improve heat resistance of a liquid crystal composition, or a filter for optical recording media, a liquid crystal color filter and an optical filter, each comprising the same.

The polymerizable group includes, for example, substituents represented by General Formulas (4) to (7).

A molecular weight of the chiral agent for liquid crystal, comprising the phosphoric acid amide represented by General Formula (1) is preferably 400 or more. When the molecular weight is 400 or more, compatibility in the liquid crystal composition may be improved, occasionally.

The chiral agent for liquid crystal, comprising the phosphoric acid amide represented by General Formula (1) preferably has high solubility in a liquid crystalline compound described hereinafter and, more preferably, the solubility parameter SP value is closed to that of the liquid crystal compound. When the phosphoric acid amide is excellent in solubility in the liquid crystalline compound described hereinafter, HTP can be improved.

Other Chiral Agents

The chiral agent for liquid crystal according to the present invention can also be used in combination with known chiral agents other than the phosphoric acid amide represented by General Formula (1).

Known chiral agent includes, for example, chiral agents described in JP-A No. 2000-44451, JP-A No. 10-509726, WO98/00428, JP-A No. 2000-506873, JP-A No. 9-506088, "Liquid Crystals" (1996, 21, 327) and "Liquid Crystals" (1998, 24, 219).

Conventional chiral agents can be used in combination with commercially available products.

Commercially available products include, for example, those manufactured from Merck Ltd. under the trade name of S101, R811 and CB15, and those manufactured by BASF Co. under the trade name of PALIOCOLOR LC756.

When the liquid crystal chiral agent according to the present invention is used to produce a liquid crystal color filter, it can be used in combination with a photoreactive chiral agent, if necessary.

Liquid Crystal Composition

The liquid crystal composition according to the present invention comprises at least the chiral agent for liquid crystal and a liquid crystalline compound, and optionally comprises a photoreactive chiral agent, a polymerizable monomer, a polymerization initiator, a binder resin, a solvent, a surfactant, a polymerization inhibitor, a thickener, a dye, a pigment, an ultraviolet absorber, a gelling agent and other components.

The liquid crystal composition according to the present invention contains the chiral agent for liquid crystal according to the present invention and is therefore excellent in compatibility and can provide hue having high color purity, and also can be preferably used to form a liquid crystal color filter, or optical films such as a circularly polarized light separating film, glasses for stereoscopic vision, a polarized light mask or a filter for optical recording media. The liquid crystal composition can also be applied to a wide-band switchable mirror, a recording medium of written by light, or the like. It is also possible to dope a ferroelectric liquid crystal, an antiferroelectric liquid crystal or a TGB phase with the liquid crystal composition. As a matter of course, the liquid crystal composition can be used as an conventional optically active polyester and can also be applied to a helical structure inducing agent in an STN element or TN element.

Chiral Agent for Liquid Crystal

The chiral agent for liquid crystal is a chiral agent for liquid crystal according to the present invention.

The content of the chiral agent for liquid crystal is not specifically limited and can be appropriately selected so as to obtain desired selective reflection. For example, the content is preferably from about 0.1 to 30% by mass based on the entire solid content (by mass) of the liquid crystal composition. When the content is from 0.1 to 30% by mass, proper orientation properties can be exhibited.

Liquid Crystalline Compound

The liquid crystalline compound is characterized in that the liquid crystal phase is fixed at a temperature lower than a liquid crystal transition temperature.

Refractive index anisotropy Δn of the liquid crystalline compound is preferably from 0.10 to 0.40.

Examples of the liquid crystalline compound include a low molecular liquid crystal compound, a high molecular liquid crystal compound and a polymerizable liquid crystal compound. Specifically, a nematic liquid crystal compound is preferable.

The liquid crystalline compound can be oriented, for example, by using an oriented substrate subjected to an orientation treatment such as rubbing treatment in a liquid crystal state upon melting.

When the liquid crystalline compound is fixed by converting the liquid crystal into a solid phase, means such as cooling or polymerization can be used.

The liquid crystalline compound may be used alone, or two or more kinds of them may be used in combination.

Specific examples of the polymerizable liquid crystal compound include polymerizable liquid crystal compounds described in JP-A No. 2001-233837, JP-A No. 2000-281629, JP-A No. 11-513360, JP-A No. 8-104870 and JP-A No. 11-80090.

As the polymerizable liquid crystal compound, commercially available products can be used.

Examples of the commercially available products include those manufactured from BASF Co. under the trade name of PALIOCOLOR LC242; those manufactured from BASF Co. under the trade name of E7; manufactured from Wacker-Chem Co. under the trade name of LC-Sllicon-CC3767; and those manufactured from Takasago International Co. under the trade name of L35, L42, L55, L59, L63, L79 and L83.

In the present invention, specific examples of the liquid crystalline compound include, but are not limited to, the following compounds.

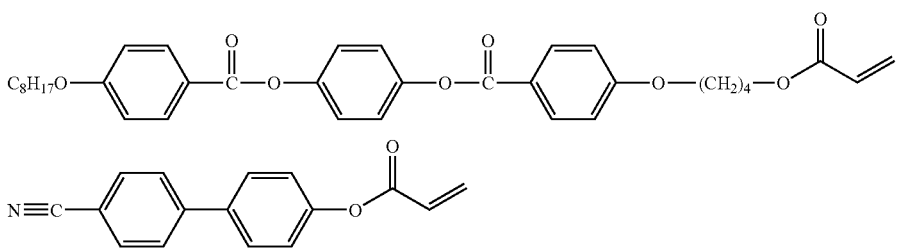

-continued
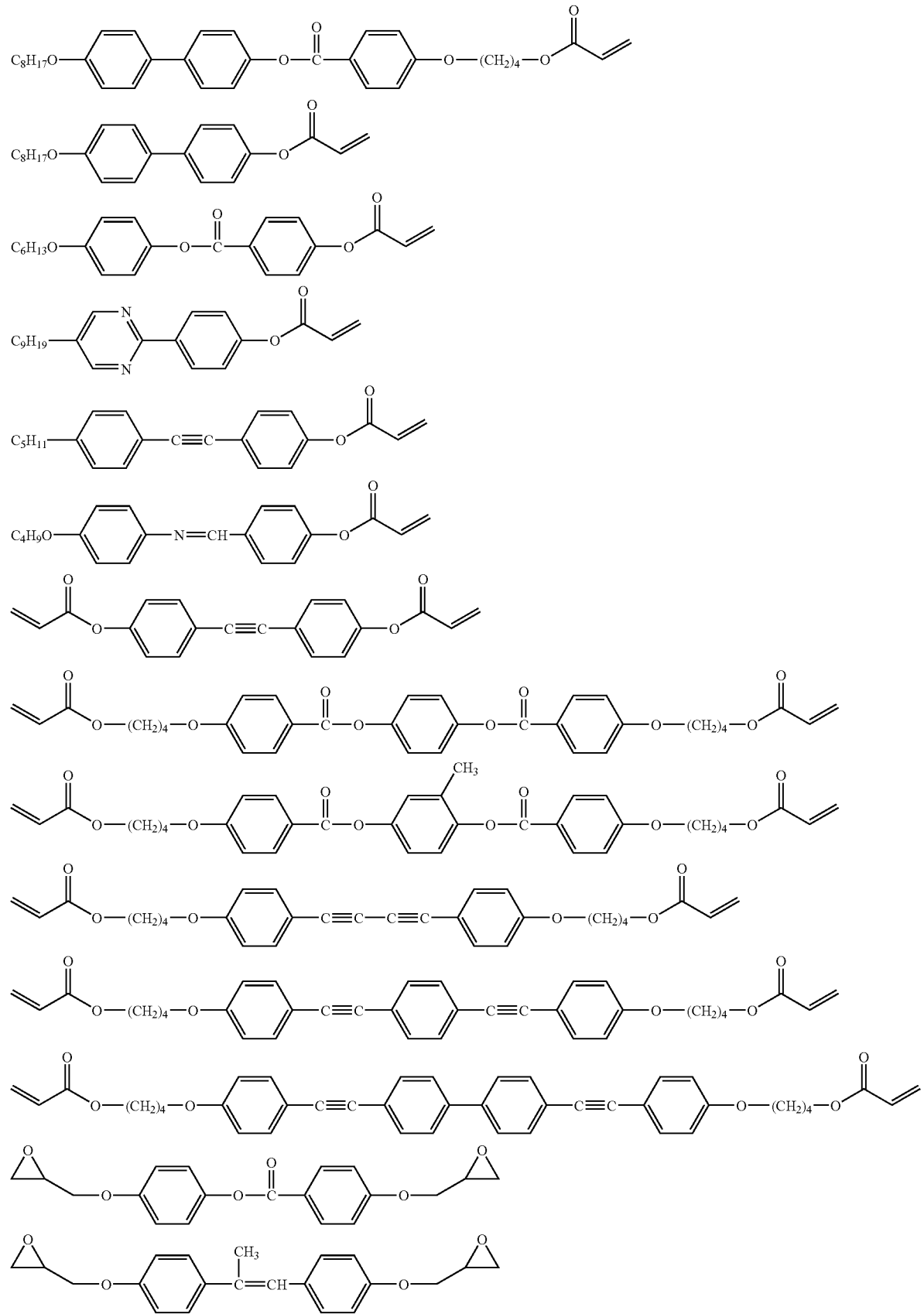

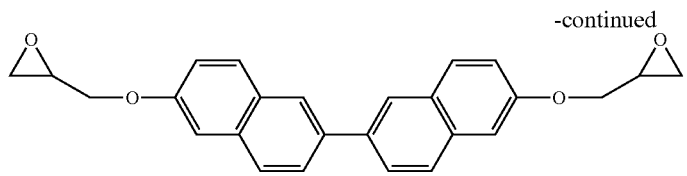

The content of the liquid crystalline compound is preferably from 10 to 90% by mass, and more preferably from 20 to 80% by mass, based on the entire solid content (by mass) of the liquid crystal composition. When the content is outside the range from 10 to 90% by mass, no liquid crystal phase may appear, occasionally.

The liquid crystalline compound preferably has a structure having a polymerizable group. When the liquid crystalline compound has a structure having a polymerizable group, it is possible to secure sufficient curability and to improve heat resistance of the layer.

The polymerizable group includes, for example, an ethylenic double bond, an oxirane structure and an oxetane structure. Among these, an ethylenic double bond is preferable. Sufficient curability can be secured when the polymerizable group is the ethylenic double bond.

Photoreactive Chiral Agent

The liquid crystal composition according to the present invention may contain a photoreactive chiral agent other than the chiral agent for liquid crystal according to the present invention.

When the photoreactive chiral agent is irradiated with light through a desired pattern or in a desired light quantity, the structure varies, and thus making it possible to vary a twisting structure of the coexisting liquid crystal compound, preferably a nematic liquid crystalline compound, and to develop a selective reflected color within a wide wavelength range.

The content of the photoreactive chiral agent is no specifically limited and can be appropriately selected, but is preferably from 0 to 20% by mass based on the entire solid content (by mass) of thee liquid crystal composition. When the content is more than 20% by mass, a liquid crystal phase may disappear, occasionally.

Specific examples of the photoreactive chiral agent include photoreactive chiral agents described in JP-A No. 2002-80478, JP-A No. 2002-80851 and JP-A No. 2002-338668.

Polymerizable Monomer

The liquid crystal composition may contain a polymerizable monomer.

The polymerizable monomer can improve the degree of cure such as film strength.

The polymerizable monomer is not specifically limited and can be appropriately selected from known polymerizable monomer acceding to the purposes and includes, for example, a monomer having an ethylenically unsaturated bond. Specific examples thereof include polyfunctional monomers such as pentaerythritol tetraacrylate and dipentaerythritol hexaacrylate. These polyfunctional monomers may be used alone or in combination.

The content of the polymerizable monomer is preferably from 0 to 50% by mass, and more preferably from 1 to 20% by mass, based on the entire solid content by mass of the liquid crystal composition. When the content is more than 50% by mass, orientation of the liquid crystal layer may be inhibited, occasionally.

Photopolymerization Initiator

The photopolymerization initiator is not specifically limited and can be appropriately selected from known photopolymerization initiators according to the purposes, and examples thereof include p-methoxyphenyl-2,4-bis(trichloromethyl)-s-triazine, 2-(p-butoxystyryl)-5-trichloromethyl 1,3,4-oxadiazole, 9-phenylacridine, 9,10-dimethylbenzphenazine, benzophenone/Michler's ketone, hexaarylbiimidazole/mercaptobenzimidazole, benzyl dimethyl ketal, acylphosphine derivative, thioxanthone/amine, and titanocene. These photopolymerization initiators may be used alone or in combination.

As the photopolymerization initiator, commercially available products may be used and the commercially available products include, for example, those manufactured by Ciba Specialty Chemicals Inc. under the trade name of Irgacure 907, Irgacure 369, Irgacure 784 and Irgacure 814, and those manufactured by BASF Co. under the trade name of Rucilin TPO.

The content of the photopolymerization initiator is preferably from 0.1 to 20% by mass, and more preferably from 0.5 to 5% by mass, based on the entire solid content by mass of the liquid crystal composition. When the content is less than 0.1% by mass, the photopolymerization may require a long time, occasionally, because of low curing efficiency upon irradiation with light. On the other hand, when the content is more than 20% by mass, a light transmittance from an ultraviolet to visible light range may be inferior, occasionally.

Sensitizer

The sensitizer is added so as to increase sensitivity of a liquid crystal composition, if necessary. The sensitizer is not specifically limited and can be appropriately selected from known sensitizers according to the purposes and includes, for example, diethylthioxanthone and isopropylthioxanthone.

The content of the sensitizer is preferably from 0.001 to 1.0% by mass based on the entire solid content by mass of the liquid crystal composition.

Binder Resin

The binder resin can adjust viscosity of the liquid crystal composition.

The binder resin is not specifically limited and can be appropriately selected from known binders according to the purposes and includes, for example, polyvinyl alcohol; a polystyrene compound such as polystyrene or poly-α-methylstyrene; a cellulose resin such as methyl cellulose, ethyl cellulose or acetyl cellulose; an acidic cellulose derivative having a carboxyl group in the side chain; an acetal resin such as polyvinylformal or polyvinyl butyral; a methacrylic acid copolymer, an acrylic acid copolymer, an itaconic acid copolymer, a crotonic acid copolymer, a maleic acid copolymer or a partially esterified maleic acid copolymer; a homopolymer of an alkyl acrylate ester or a homopolymer of an alkyl methacrylate ester; and a polymer having the other hydroxyl group. These binder resins may be used alone or in combination.

Examples of the alkyl group in the homopolymer of the alkyl acrylate ester or the homopolymer of the alkyl methacrylate ester include methyl group, ethyl group, n-propyl group, n-butyl group, iso-butyl group, n-hexyl group, cyclohexyl group and 2-ethylhexyl group.

The other polymer having a hydroxyl group includes, for example, benzyl (meth)acrylate/(homopolymer of methacrylic acid) acrylic acid copolymer, benzyl (meth)acrylate/(meth)acrylic acid/multielement copolymer of the other monomer.

The content of the binder resin is preferably from 0 to 50% by mass, and more 0 to 20% by mass, based on the entire solid content by mass of the liquid crystal composition. When the content is more than 50% by mass, orientation of the liquid crystal layer may become insufficient, occasionally.

Polymerization Inhibitor

The polymerization inhibitor is not specifically limited and can be appropriately selected according to the purposes and includes, for example, hydroquinone, hydroquinone monomethyl ether, phenothiazine, benzoquinone, or derivatives thereof.

The content of the polymerization inhibitor is preferably from 0 to 10% by mass, and more preferably from 100 ppm to 1% by mass, based on the solid content by mass of the polymerizable monomer.

Solvent

The solvent is not specifically limited and can be appropriately selected from known photopolymerization initiators according to the purposes and includes, for example, alkoxypropionate esters such as methyl 3-methoxypropionate, 3-ethyl methoxypropionate, propyl 3-methoxypropionate, methyl 3-ethoxypropionate, ethyl 3-ethoxypropionate and propyl 3-ethoxypropionate; esters of an alkoxy alcohol, such as 2-methoxypropyl acetate, 2-ethoxypropyl acetate and 3-methoxybutyl acetate; lactate esters such as methyl lactate and ethyl lactate; ketones such as methyl ethyl ketone, cyclohexanone and methylcyclohexanone; and γ-butyrolactone, N-methylpyrrolidone, dimethyl sulfoxide, chloroform and tetrahydrofuran. These solvents may be used alone or in combination.

Polymer

The polymer according to the present invention is a polymer wherein the liquid crystal composition according to the present invention is cured by polymerization.

The polymer according to the present invention is composed of the liquid crystal composition according to the present invention and is therefore excellent in productivity and can provide hue having high color purity, and can be used to form a liquid crystal color filter, or optical films such as a circularly polarized light separating film, glasses for stereoscopic vision, or a polarized light mask. The polymer can also be applied to a wide-band switchable mirror, a recording medium of written by light, or the like. It is also possible to dope a ferroelectric liquid crystal, an antiferroelectric liquid crystal or a TGB phase with the polymer. As a matter of course, the polymer can be used as a conventional optically active polyester and can also be applied to a helical structure inducing agent in an STN element or TN element.

The polymer is preferably a cholesteric liquid crystal polymer.

For example, the thickness of the polymer is preferably from 1 to 10 μm, and more preferably from 2 to 7 μm. When the thickness is more than 10 μm, uniform orientation of a liquid crystal may be disturbed, occasionally. On the other hand, when the thickness is less than 1 μm, selective reflectivity may come insufficient, occasionally, when used as a cholesteric liquid crystal layer.

Method for Preparation of Polymer

The method for preparation of the polymer is not specifically limited and can be appropriately selected according to the purposes and, for example, the polymer can be formed by coating the liquid crystal composition on a base material, followed by drying and further irradiation with ultraviolet ray. When an optically active compound is added to the liquid crystal composition, a cholesteric liquid crystal polymer can be obtained.

The fact that the liquid crystal composition and the polymer form a cholesteric phase can be confirmed by a selective reflected color derived from the cholesteric phase, and a pattern peculiar to the cholesteric phase upon observation using a microscope.

Among these methods for preparation of the polymer, a method having most excellent mass production aptitude is a method comprising preparing the base material wound in a roll form, and coating the liquid crystal composition using a continuous coater such as bar coater, a die coater, blade coater or curtain coater.

As the base material, the same base material as that used in a filter for optical recording media described hereinafter can be used.

Examples of the coating method include spin coating method, cast method, roll coating method, flow coating method, printing method, dip coating method, casting film forming method, car coating method and gravure printing method.

The conditions of irradiation with ultraviolet ray are not specifically limited and can be appropriately selected according to the purposes. For example, a wavelength of ultraviolet ray is preferably from 160 to 380 nm, and more preferably from 250 to 380 nm. For example, an irradiation time is preferably from 0.1 to 600 seconds, and more preferably from 0.3 to 300 seconds. Also, irradiation with light may be carried out under heating conditions so as to promote the photopolymerization reaction.

Examples of a light source of ultraviolet ray include low-pressure mercury lamp (bactericidal lamp, fluorescent chemical lamp, black light, etc.), high-pressure discharge lamp (high-pressure mercury lamp, metal halide lamp, etc.) and short arc discharge lamp (super-high-pressure mercury lamp, xenon lamp, mercury xenon lamp, etc.).

Filter for Optical Recording Media

The filter for optical recording media according to the present invention comprises a cholesteric liquid crystal layer and further comprises a base material and other members.

The cholesteric liquid crystal layer comprises the liquid crystal composition according to the present invention.

The filter for optical recording media according to the present invention has a function of preventing irregular reflection from a reflective film of an optical recording medium due to informing light and reference light and preventing the occurrence of noises without causing deviation of a selective reflected wavelength even if an incidence angle varies. By laminating the filter for optical recording media on an optical recording medium, optical recording having excellent resolution and diffraction efficiency can be obtained.

The filter for optical recording media according to the present invention preferably has a function of transmitting light having a first wavelength and reflecting light having a second wavelength which is different from the light having a first wavelength.

The wavelength of the light having a first wavelength is preferably from 350 to 600 nm.

The wavelength of the light having a second wavelength is preferably from 600 to 900 nm.

In case of light having a wavelength of 655 nm, a light transmittance of the filter for optical recording media is preferably 50% or more, and more preferably 80% or more. Furthermore, optical reflectivity of the filter for optical recording media is preferably 30% or more, and more preferably 40% or more, in case of light having a wavelength of 532 nm.

The filter for optical recording media according to the present invention can be used in various fields, and can be preferably used to form or produce a hologram type optical recording medium. At this time, the filter for optical recording media may be laminated by directly coating the liquid crystal composition according to the present invention on a substrate described hereinafter, together with a recording layer, followed by drying. Alternatively, the liquid crystal composition according to the present invention may be coated on a base material such as film and dried to produce a filter for optical recording media, and then a filter for information recording media may be laminated on the substrate.

Base Material

The shape, structure and size of the base material are not specifically limited and can be appropriately selected according to the purposes.

The shape includes, for example, plate, sheet or the like.

The structure may be either a single-layered or multi-layered structure.

The size can be appropriately selected according to the size of the filter for optical recording media.

The material of the base material is not specifically limited and both inorganic and organic materials can be used.

Examples of the inorganic material include glass, quartz and silicone.

Examples of the organic material include acetate-based resin such as triacetyl cellulose, polyester-based resin, polyethersulfone-based resin, polysulfone-based resin, polycarbonate-based resin, polyamide-based resin, polyimide-based resin, polyolefin-based resin, acrylic resin, polynorbornene-based resin, cellulose-based resin, polyallylate-based resin, polystyrene-based resin, polyvinyl alcohol-based resin, polyvinyl chloride-based resin, polyvinylidene chloride-based resin and polyacrylic resin. These resins may be used alone or in combination.

The base material may be appropriately synthesized, or commercially available products may be used.

The thickness of the base material is not specifically limited and can be appropriately selected according to the purposes, and is preferably from 10 to 500 μm, and more preferably from 50 to 300 μm. When the thickness of the base material is less than 10 μm, adhesion may deteriorate, occasionally by deflection of the substrate. On the other hand, when the thickness is more than 500 μm, it is necessary to remarkably shift the focal position of informing light and reference light, and thus the size of an optical system may increase, occasionally.

Optical Recording Medium

The optical recording medium according to the present invention comprises a substrate, a filter for optical recording media according to the present invention, a recording layer which records information utilizing holography and, if necessary, the other layer selected appropriately.

The optical recording medium according to the present invention may be of a relatively thin plane hologram to record two-dimensional information or a volume hologram to record numerous information such as stereo images, alternatively of transmissive or reflective typetransmission or reflection type hologram.

The recording mode of the hologram may be, for example, of amplitude hologram, phase hologram, brazed hologram or complex amplitude hologram.

The optical recording medium according to the present invention uses the filter for optical recording media according to the present invention as a filter layer and is therefore capable of efficiently mass-producing a hologram type optical recording medium capable of preventing irregular reflection from a reflective film of an optical recording medium due to informing light and reference light and preventing the occurrence of noises without causing deviation of a selective reflected wavelength even if an incidence angle varies, and also can provide an optical recording medium capable of recording highly precise information.

The optical recording medium according to the present invention is used for a collinear system wherein informing light and reference light are irradiated as coaxial light beam and includes, for example, an optical recording medium comprising a first substrate, a second substrate, a recording layer formed on the second substrate, and a filter layer formed between the second substrate and the recording layer.

The optical recording medium of a collinear system is described in detail in JP-A No. 11-311936 and JP-A No. 2004-265472, while the recording layer of the hologram is described in detail in JP-A No. 11-352303.

Liquid Crystal Color Filter

The liquid crystal color filter according to the present invention at least comprises a chiral agent for liquid crystal composed of a phosphoric acid amide of General Formula (1) and a liquid crystalline compound, and further comprises a photoreactive chiral agent, a polymerizable monomer, photopolymerization initiator, other components listed in the liquid crystal composition according to the present invention, and a surfactant which exerts an excluded volume effect.

The liquid crystal compound, the chiral agent for liquid crystal, the polymerizable monomer, the photopolymerization initiator and the other component are the same as those which can be used in the liquid crystal composition according to the present invention, and the content and preferable range are also the same as those in case of the liquid crystal composition.

The content of the phosphoric acid amide represented by General Formula (1) in the liquid crystal composition constituting the liquid crystal color filter is also the same as in the above-mentioned liquid crystal composition according to the present invention.

For example, the liquid crystalline compound is preferably a nematic liquid crystal compound.

The method for producing a liquid crystal color filter includes, for example, a method described in JP-A No. 2002-180051.

When a phosphoric acid amide represented by General Formula (1) is used as the chiral agent for liquid crystal, a twisting power (twisting angle) of the liquid crystal can increase and therefore color purity of three primary colors of blue (B), green (G) and red (R) can also be enhanced. Therefore, selectivity and vividness of hue of the liquid crystal are improved, and thus a liquid crystal color filter can be provided.

Optical Film

The optical film according to the present invention can be preferably produced using the liquid crystal composition according to the present invention.

The optical film according to the present invention is composed of an optical film material comprising a chiral agent for liquid crystal composed of a phosphoric acid amide represented by General Formula (1) and at least a liquid crystalline compound and, if necessary, a photoreactive chiral agent, a polymerizable monomer, a photopolymerization initiator, a surfactant which exerts an excluded volume effect, and other components listed in the liquid crystal composition according to the present invention.

As the liquid crystal compound, the chiral agent for liquid crystal, the polymerizable monomer, the photopolymerization initiator and other components, it is possible to use those which can be used in the liquid crystal composition according to the present invention, and the content and preferable range are the same as those in case of the liquid crystal composition.

Also, the content of the phosphoric acid amide represented by General Formula (1) in the liquid crystal composition constituting the optical film is the same as that in case of the above-mentioned liquid crystal composition according to the present invention.

The form of the optical film is not specifically limited and may be the form of a sheet composed only of the liquid crystal composition, or the form wherein a layer (liquid crystal layer) containing a liquid crystal composition is formed on a desired support or a temporally support and, furthermore, the other layer (film) such as oriented film or protective film may be formed.

The optical film can be formed by irradiating the optical film material with light through an appropriately selected desired pattern or in an appropriately selected desired light quantity.

The optical film can be formed by almost the same method as that of the liquid crystal color filter and also may be a method including at least one exposure process described above.

Also, according to the production aspect to be selected, the optical film may be formed through the processes such as orientation treatment process, transfer process and the like.

As described above, when the liquid crystal composition containing the optically active polyester having at least constituent units represented by General Formula (I) is used, the range of selective reflected colors which the liquid crystal can exhibit becomes wide, and thus a liquid crystal color filter which is excellent in color purity and resolution and has three primary colors of blue (B), green (G) and red (R) can be obtained.

The method for producing an optical filter includes, for example, a method described in JP-A No. 2002-180051.

EXAMPLES

The present invention will now be explained with reference to Examples, but to which the present invention should be limited in no way. Parts and percentages in Examples are by mass unless otherwise specified.

Measurement of Helical Pitch of Chiral Agent for Liquid Crystal

Example 1

One Part of a phosphoric acid amide, represented by No. 1-3 obtained by the following Preparation Method 1, was mixed with 99 parts of a cholesteric liquid crystal composition (trade name: ZLI-1132, Merck Ltd.) to obtain a mixed solution. The mixed solution was poured into a wedge-shaped cell (glass thickness: 1.1 mm, blue plate) subjected to mono-axially-orienting treatment with a polyimide oriented film.

The helical pitch of the liquid crystal cell was measured at room temperature using a polarized light microscope to be 1.49 μm. The pitch was converted to a helical twisting power (HTP) to be 67 μm$^{-1}$. The twist direction was determined to be left in accordance with a contact method.

Preparation Method 1 (Synthesis of Phosphoric Acid Amide Represented by No. 1-3)

To a mixture of 0.37 g (1 mmol) of (R)-1,1'-binaphthyl-2,2'-diyl-chlorophosphate, 2 g of ethylene carbonate and 0.08 ml (1 mmol) of pyridine, 0.12 g (1 mmol) of p-methoxyaniline was added, followed by stirring at 40° C. for 2 hours to obtain a reaction mixture. The reaction mixture was precipitated by poured into 1N hydrochloric acid aqueous solution. The resulting solid was collected by filtration and then purified by column chromatography. As a result, 0.2 g (0.4 mmol) of a phosphoric acid amide represented by No. 1-3 was obtained in a yield of 40%.

$^1$H-NMR (CDCl$_3$) of the phosphoric acid amide represented by No. 0.1-3 was as follows: δ (in ppm from TMS): 8.06(1H, d), 7.97-7.84(3H, m), 7.50-7.25(7H, m), 7.00(1H, d), 6.71(2H, d), 4.98(1H, d), 3.76(3H, s); TMS: tetramethylsilane.

Example 2

A mixed solution was prepared in the same manner as in Example 1, except that 1 part of the phosphoric acid amide represented by No. 1-3 was replaced into 1 part of the phosphoric acid amide represented by No. 1-7, then the helical pitch was measured and the value of HTP and the direction of the twist were determined.

The phosphoric acid amide represented by No. 1-7 was synthesized by the following preparation method 2.

Preparation Method 2 (Synthesis of Phosphoric Acid Amide Represented by No. 1-7)

To a mixture of 0.37 g (1 mmol) of (R)-1,1'-binaphthyl-2,2'-diyl-chlorophosphate, 2 g of ethylene carbonate and 0.08 ml (1 mmol) of pyridine, 0.22 g (2 mmol) of p-aminophenol was added, followed by stirring at 40° C. for one hour to obtain a reaction mixture. The reaction mixture was poured into 1N hydrochloric acid aqueous solution, extracted with ethyl acetate and then purified by column chromatography. As a result, 0.4 g (0.9 mmol) of the phosphoric acid amide represented by No. 1-5 was obtained in a yield of 91%.

$^1$H-NMR (CDCl$_3$) of the phosphoric acid amide represented by No. 1-5 was as follows: δ (in ppm from TMS): 8.04(1H, d), 8.00-7.87(3H, m), 7.08(1H, d), 7.51-7.23(7H, m), 6.85(2H, d), 6.79(1H, s), 6.60(2H, d), 5.04(1H, d).

Next, a mixture of 0.44 g (1 mmol) of the phosphoric acid amide represented by No. 1-5, 2 ml of tetrahydrofuran (THF), 0.22 ml (2.1 mmol) of N-methylmorpholine and a catalytic amount of 4-dimethylaminopyridine was ice-cooled and 1 ml of a THF solution containing 0.18 ml (2.1 mmol) of acrylic acid chloride was added dropwise to the mixture, followed by stirring at room temperature for 2 hours to obtain a reaction mixture. The reaction mixture was poured into water, extracted with ethyl acetate, concentrated and then purified by column chromatography. As a result, 0.1 g (0.2 mmol) of the phosphoric acid amide represented by No. 1-7 was obtained in a yield of 20%.

$^1$H-NMR (CDCl$_3$) of the phosphoric acid amide represented by No. 1-7 was as follows: β (in ppm from TMS): 8.04(1H, d), 8.00-7.84(3H, m), 7.61(1H, d), 7.53-7.23(7H, m), 7.04(2H, d), 6.90(2H, d), 6.57(1H, d), 6.29(1H, dd), 6.00(1H, d), 5.67-5.59(1H, m).

Example 3

A mixed solution was prepared in the same manner as in Example 1, except that 1 part of the phosphoric acid amide represented by No. 1-3 was replaced into 1 part of the phosphoric acid amide represented by No. 2-2, then the helical pitch was measured and the value of HTP and the direction of the twist were determined.

The phosphoric acid amide represented by No. 2-2 was synthesized by the following preparation method 3.

Preparation Method 3 (Synthesis of Phosphoric Acid Amide Represented by No. 2-2)

To a mixture of 0.81 g (8.8 mmol) of hexylamine, 5 ml of tetrahydrofuran and 0.3 g (4 mmol) of pyridine, 1.47 g (4 mmol) of (R)-1,1'-binaphthyl-2,2'-diyl-chlorophosphate was added, followed by stirring at 25° C. for 4.5 hours to obtain a reaction mixture. The reaction mixture was poured into 1N hydrochloric acid aqueous solution, extracted with ethyl acetate and then purified by column chromatography. As a result, 0.9 g (2.1 mmol) of the phosphoric acid amide represented by No. 2-2 was obtained in a yield of 50%.

$^1$H-NMR (CDCl$_3$) of the phosphoric acid amide represented by No. 2-2 was as follows: δ (in ppm from TMS): 8.04-7.92(4H, m), 7.63-7.25(8H, m), 3.00-2.96(2H, m), 1.50-1.45(2H, m), 1.29-1.21(6H, m), 0.84(3H, m).

Example 4

A mixed solution was prepared in the same manner as in Example 1, except that 1 part of the phosphoric acid amide represented by No. 1-3 was replaced into 1 part of the phosphoric acid amide represented by No. 2-11, then the helical pitch was measured and the value of HTP and the direction of the twist were determined.

The phosphoric acid amide represented by No. 2-11 was synthesized by the following preparation method 4.

Preparation Method 4 (Synthesis of Phosphoric Acid Amide Represented by No. 2-11)

To a mixture of 2.50 g (6.8 mmol) of β-alaninebenzyl ester p-toluenesulfonate, 5 ml of tetrahydrofuran, 0.95 ml (6.8 mmol) of triethylamine and 0.34 ml (4.7 mmol) of pyridine, 1.24 g (3.4 mmol) of (R)-1,1'-binaphthyl-2,2'-diyl-chlorophosphate was added, followed by stirring at 25° C. for 4.5 hours to obtain a reaction mixture. The reaction mixture was poured into 1N hydrochloric acid aqueous solution, extracted with ethyl acetate and then purified by column chromatography. As a result, 0.8 g (1.6 mmol) of the phosphoric acid amide represented by No. 2-11 was obtained in a yield of 47%.

$^1$H-NMR (CDCl$_3$) of the phosphoric acid amide represented by No. 2-11 was as follows: δ (in ppm from TMS): 8.04-7.87(4H, m), 7.60-7.24(13H, m), 5.11(2H, s), 3.63-3.50(1H, m), 3.36-3.17(2H, m), 2.63-2.53(2H, m).

Example 5

A mixed solution was prepared in the same manner as in Example 1, except that 1 part of the phosphoric acid amide represented by No. 1-3 was replaced into 1 part of the phosphoric acid amide represented by No. 2-12, then the helical pitch was measured and the value of HTP and the direction of the twist were determined.

The phosphoric acid amide represented by No. 2-12 was synthesized by the following preparation method 5.

Preparation Method 5 (Synthesis of Phosphoric Acid Amide Represented by No. 2-12)

2.5 g (5 mmol) of the phosphoric acid amide represented by No. 2-11, 10 ml of methanol and 125 mg of 10% Pd/C (water content: 50%) were mixed and stirred at room temperature for 4 hours while bubbling a hydrogen gas. The reaction mixture was poured into water, extracted with ethyl acetate and then concentrated. As a result, 2.1 g (4.9 mmol) of the phosphoric acid amide represented by No. 2-12 was obtained in a yield of 100%.

$^1$H-NMR (CDCl$_3$) of the phosphoric acid amide represented by No. 2-12 was as follows: δ (in ppm from TMS): 8.06-7.92(4H, m), 7.63-7.29(8H, m), 5.71-5.56(1H, m), 3.13-2.97(1H, m), 2.57-2.44(1H, m), 2.38-2.15(2H, m).

Example 6

A mixed solution was prepared in the same manner as in Example 1, except that 1 part of the phosphoric acid amide represented by No. 1-3 was replaced into 1 part of the phosphoric acid amide represented by No. 2-14, then the helical pitch was measured and the value of HTP and the direction of the twist were determined.

The phosphoric acid amide represented by No. 2-14 was synthesized by the following preparation method 6.

Preparation Method 6 (Synthesis of Phosphoric Acid Amide Represented by No. 2-14)

To a mixture of 1.32 g (3.62 mmol) of (R)-1,1'-binaphthyl-2,2'-diyl-chlorophosphate, 5 ml of tetrahydrofuran, 1.0 ml (7.23 mmol) of triethylamine and 0.6 ml (5.07 mmol) of pyridine, 1.40 g (7.23 mmol) of 6-acryloylhexylamine hydrochloride was added, followed by stirring at 25° C. for 1.5 hours to obtain a reaction mixture. The reaction mixture was poured into 1N hydrochloric acid aqueous solution, extracted with ethyl acetate and then purified by column chromatography. As a result, 0.5 g (1.0 mmol) of the phosphoric acid amide represented by No. 2-14 was obtained in a yield of 28%.

$^1$H-NMR (CDCl$_3$) of the phosphoric acid amide represented by No. 2-14 was as follows: δ (in ppm from TMS): 8.06-7.90(4H, m), 7.63-7.25(8H, m), 6.38(1H, d), 6.08(1H, dd), 5.80(1H, d), 4.12(2H, t), 3.00-2.95(2H, m), 2.88-2.74 (1H, m), 1.69-1.34(10H, m).

TABLE 1

| | Exemplified compound | HTP (μm$^{-1}$) | Direction of twist |
|---|---|---|---|
| Ex. 1 | No. 1-3 | 67 | left |
| Ex. 2 | No. 1-7 | 49 | left |
| Ex. 3 | No. 2-2 | 59 | left |
| Ex. 4 | No. 2-11 | 39 | left |
| Ex. 5 | No. 2-12 | 50 | left |
| Ex. 6 | No. 2-14 | 49 | left |

Preparation of Liquid Crystal Composition and Formation of Cholesteric Liquid Crystal Polymer Example 7

A polyimide oriented film LX-1400 manufactured by Hitachi Chemical DuPont Co., Ltd. was formed on a glass substrate, followed by rubbing. On the oriented film, a liquid crystal composition prepared according to the following formulation was coated using a spin coater and then dried in an oven at 100° C. for 2 hours to form a coating layer.

Composition of Liquid Crystal Composition

| Liquid crystalline compound*[1] | 90 parts |
|---|---|
| Chiral agent for liquid crystal*[2] | 7 parts |
| Photopolymerization initiator*[3] | 3 parts |
| Methyl ethyl ketone | 200 parts |

*[1] trade name: Paliocolor LC-242, by BASF Co.
*[2] phosphoric acid amide represented by No. 1-3
*[3] trade name: Lucurin TPO, by BASF Co.

Next, the coated glass substrate was held on a hot plate at 50° C. for 5 minutes in the state where the surface of the glass substrate is brought into contact with the hot plate, thereby developing a color of a coating layer. As a result, a selective reflected color derived from a cholesteric liquid crystal phase was obtained.

While blowing a nitrogen gas over the substrate, the entire surface was irradiated at 50° C. with light from a super-high-pressure mercury lamp at an irradiation energy of 300 mJ/cm$^2$ so as to polymerize and harden the coating on the substrate, thereby fixing a green selective reflected color to obtain a cholesteric liquid crystal polymer.

Example 8

In the same manner as in Example 7, except that 7 parts by mass of the phosphoric acid amide represented by No. 1-3 was replaced by 10 parts by mass of the phosphoric acid amide represented by No. 1-7 in the liquid crystal composition, a coating film was produced and a color of a coating layer was developed. As a result, a selective reflected color derived from a cholesteric liquid crystal phase was obtained. In the same manner as in Example 7, the coating on the substrate was polymerized to harden, thereby fixing a color to obtain a cholesteric liquid crystal polymer.

Example 9

In the same manner as in Example 7, except that 7 parts by mass of the phosphoric acid amide represented by No. 1-3 was replaced by 7.5 parts by mass of the phosphoric acid amide represented by No. 2-2 in the liquid crystal composition, a coating film was produced and a color of a coating layer was developed. As a result, a selective reflected color derived from a cholesteric liquid crystal phase was obtained. In the same manner as in Example 7, the coating on the substrate was polymerized to harden, thereby fixing a color to obtain a cholesteric liquid crystal polymer.

Example 10

In the same manner as in Example 7, except that 7 parts by mass of the phosphoric acid amide represented by No. 1-3 was replaced by 13 parts by mass of the phosphoric acid amide represented by No. 2-11 in the liquid crystal composition, a coating film was produced and a color of a coating layer was developed. As a result, a selective reflected color derived from a cholesteric liquid crystal phase was obtained. In the same manner as in Example 7, the coating on the substrate was polymerized to harden, thereby fixing a color to obtain a cholesteric liquid crystal polymer.

Example 11

In the same manner as in Example 7, except that 7 parts by mass of the phosphoric acid amide represented by No. 1-3 was replaced by 9 parts by mass of the phosphoric acid amide represented by No. 2-12 in the liquid crystal composition, a coating film was produced and a color of a coating layer was developed. As a result, a selective reflected color derived from a cholesteric liquid crystal phase was obtained. In the same manner as in Example 7, the coating on the substrate was polymerized to harden, thereby fixing a color to obtain a cholesteric liquid crystal polymer.

Example 12

In the same manner as in Example 7, except that 7 parts by mass of the phosphoric acid amide represented by No. 1-3 was replaced by 9 parts by mass of the phosphoric acid amide represented by No. 2-14 in the liquid crystal composition, a coating film was produced and a color of a coating layer was developed. As a result, a selective reflected color derived from a cholesteric liquid crystal phase was obtained. In the same manner as in Example 7, the coating on the substrate was polymerized to harden, thereby fixing a color to obtain a cholesteric liquid crystal polymer.

Example 13

In the same manner as in Example 7, except that 90 parts by mass of Paliocolor LC-242 as the liquid crystalline compound was replaced by 60 parts by mass of the following compound A and 30 parts by mass of Paliocolor LC-242 in the liquid crystal composition, a liquid crystal composition was prepared and coated on the same substrate as in Example 7. Next, the coated glass substrate was held on a hot plate at 70° C. for 5 minutes in the state where the surface of the glass substrate is brought into contact with the hot plate, thereby developing a color of a coating layer. As a result, a selective reflected color derived from a cholesteric liquid crystal phase was obtained and a half value width of the transmission spectrum was 60 nm.

While blowing a nitrogen gas over the substrate, the entire surface was irradiated at 70° C. with light from a super-high-pressure mercury lamp at an irradiation energy of 500 mJ/cm$^2$ so as to polymerize and harden the coating on the substrate, thereby fixing a green selective reflected color to obtain a cholesteric liquid crystal polymer.

Compound (A)

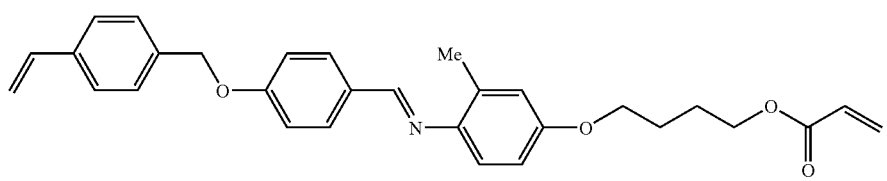

Production of Filter for Optical Recording Media

Example 14

A base film obtained by coating polyvinyl alcohol (by KURARAY CO., LTD., trade name: MP203) on a 100 μm thick polycarbonate film (by Mitsubishi Gas Chemical Company, Inc., trade name: Iupilon) so as to form a coat having a thickness of 1 μm was prepared. The surface of the polyvinyl alcohol coat was rubbed by passing the base film through a rubbing device, thereby imparting liquid crystal orientation ability.

Next, on the base film, the coating solution for a cholesteric liquid crystal layer of Example 13 was coated by a spin coater and dried in an oven at 100° C. for 2 minutes to obtain a cholesteric liquid crystal layer.

Next, the coated polycarbonate substrate was held on a hot plate at 70° C. for 5 minutes in the state where the surface of the polycarbonate substrate is brought into contact with the hot plate, thereby developing a color of a cholesteric liquid crystal layer. While blowing a nitrogen gas over the substrate, the entire surface was irradiated at 70° C. with light from a super-high-pressure mercury lamp at an irradiation energy of 500 mJ/cm$^2$ to form a cholesteric liquid crystal layer cured film having a thickness of 4.1 μm. Consequently, a filter for optical recording media of Example 14 was produced.

Production of Optical Recording Medium

As a second substrate, a conventional polycarbonate resin substrate having a diameter of 120 mm and a thickness of 0.6 mm used for DVD+RW was employed. On the entire surface of the substrate, a servo pit pattern is formed and the track pitch is 0.74 μm, the groove depth is 175 nm, and the groove width is 300 nm.

First, on the surface of the servo pit pattern of the second substrate, a reflective film was formed. Aluminum (Al) was used as a reflective film material. Using a DC magnetron sputtering method, a 200 nm thick Al reflective film was formed. On the reflective film, a 100 μm thick polycarbonate film as a first gap layer was bonded using an ultraviolet curable resin.

Next, a disc having a predetermined size was punched from the resulting filter for optical recording medium so that it can be disposed on the substrate and laminated so that the surface of the base film faces with the side of the servo pit pattern. Lamination was conducted so as to trap no air bubbles using an ultraviolet curable resin or an adhesive. Thus, a filter layer was formed.

Next, as a recording layer material, the following components were mixed under a nitrogen gas flow to prepare a photopolymer coating solution.

Composition of Photopolymer Coating Solution

| | |
|---|---|
| Biscyclohexylmethane diisocyanate | 31.5% |
| Polypropyleneoxide triol*[1] | 61.2% |
| Tetramethylene glycol | 2.5% |
| 2,4,6-tribromophenyl acrylate | 3.1% |
| Photopolymerization initiator*[2] | 0.69% |
| Dibutyltin dilaurate | 1.01% |

*[1] molecular weight: 1000
*[2] by Ciba Specialty Chemicals Inc., Irgacure 784)

The resulting photopolymer coating solution was piled up on the filter layer using a dispenser, and then the disc end and the first substrate were laminated using an adhesive while pressing a polycarbonate resin first substrate having a diameter of 12 cm and a thickness of 0.6 mm on the photopolymer. The disc end is provided with a flange portion so that the thickness of the photopolymer layer is adjusted to 500 μm and, by bonding the first substrate to the disk end, the thickness of the photopolymer layer is decided and also excessive photopolymer spill over and removed. Thus, an optical recording medium of Example 14 was produced.

Recording on Optical Recording Medium and Evaluation

Next, the resulting optical recording apparatus was mounted in an optical recording/reproducing apparatus (by Pulstec Industrial Co., Ltd., SHOT-1000) and information was actually recorded and reproduced, and then signal-to-noise ratio (SNR) of the reproduced images was measured. As a result, SNR was 4.2 and superior reproduced images were obtained. At this time, a code error rate was 10$^{-4}$ or less.

Example 15

Production of Liquid Crystal Color Filter (1) Preparation of Filter Substrate

On a glass substrate, a polyimide oriented film coating solution (trade name: LX-1400, by Hitachi Chemical DuPont Co., Ltd.) was coated using a spin coater, dried in an oven at 100° C. for 5 minutes and then baked in an oven at 250° C. for one hour to form an oriented film.

(2) Formation of Filter Layer

On an oriented film of the resulting glass substrate with the oriented film, the coating solution for photosensitive resin layer prepared according to the following formulation was coated by a spin coater and dried in an oven at 100° C. for 2 minutes to form a photosensitive resin layer.

Composition of Coating Solution for Photosensitive Resin Layer

| | |
|---|---|
| Compound of Formula (10) below | 42 parts |
| Compound of Formula (11) below | 42 parts |
| Phosphoric acid amide No. 2-2 | 9 parts |
| Compound of Formula (12) below | 6 parts |
| Compound of Formula (13) below | 2 parts |
| Dipentaerythritol hexaacrylate | 3 parts |
| Chloroform | 400 parts |

Formula (10)

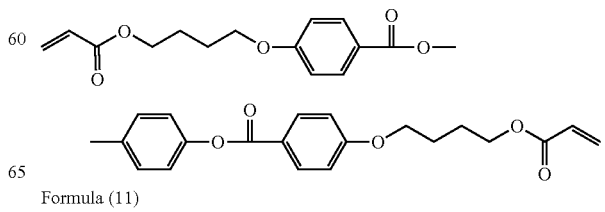

Formula (11)

-continued

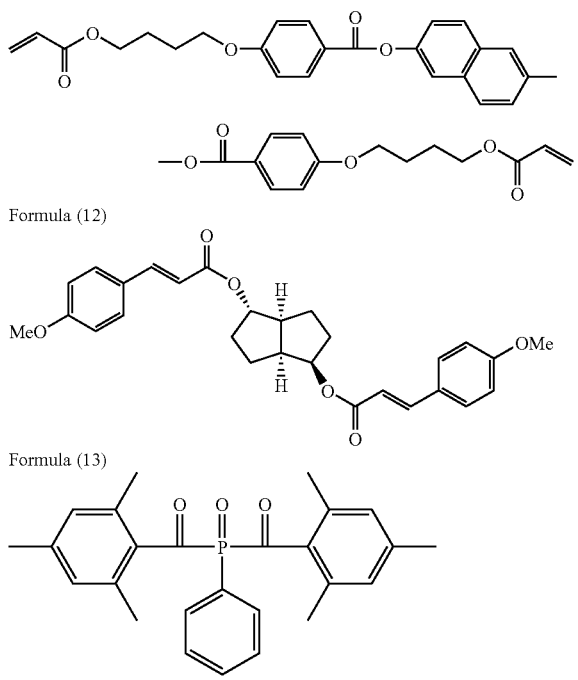

Formula (12)

Formula (13)

Next, the coated glass substrate was held on a hot plate at 100° C. for 5 minutes in the state where the surface of the glass substrate is brought into contact with the hot plate, thereby developing a color of a photosensitive resin layer.

Furthermore, a super-high-pressure mercury lamp was arranged through the following over the photosensitive resin layer: a photo mask having three transmittances (0%, 46% and 92%) and having areas arranged correspondingly to red pixels, green pixels and blue pixels, and a band pass filter having a central wavelength of 365 nm. The photosensitive resin layer was irradiated with light from the super-high-pressure mercury lamp through the photo mask and the band pass filter, and was patterned.

At this time, the irradiation energy for the blue pixels was 300 mJ/cm$^2$, and the irradiation intensity was 30 mW/cm$^2$.

Next, the photo mask and the band pass filter were removed. While blowing a nitrogen gas over the substrate, the entire surface was irradiated with light from the same super-high-pressure mercury lamp at an irradiation energy of 500 mJ/cm$^2$, so as to polymerize and harden the resin layer on the substrate.

In order to promote the degree of cure of the filter portion (photosensitive resin layer), the substrate was baked in the oven at 220° C. for 20 minutes to produce a color filter wherein red pixel, green pixel and blue pixel patterns were formed.

At the time of patterning, the liquid crystal helical pitch (helical twisting power of liquid crystal) can be changed significantly by the irradiation, and thus a pixel pattern including red, green and blue colors can be formed with high color purity.

In Examples 1 to 6, it was found that a liquid crystal chiral agent composed of the phosphoric acid amide represented by General Formula (1) exhibits a high twisting power. In Examples 7 to 13, it was found that a polymer obtained by polymerizing a liquid crystal composition containing the chiral agent for liquid crystal exhibits appropriate selective reflection. In Example 14, it was found that an optical recording medium using an optical recording medium filter containing the polymer is less likely to cause the occurrence of noises. Also, in Example 15, it was found that a liquid crystalline color filter containing the polymer can be produced.

According to the present invention, it is possible to solve the above various problems in the prior art and to provide a chiral agent for liquid crystal, which can impart a high twisting power to a liquid crystalline compound and is excellent in compatibility with the liquid crystal compound; a liquid crystal composition, a polymer and a liquid crystal color filter, which can provide hue having high color purity; a filter for optical recording media, which causes neither deviation of a selective reflected wavelength nor distortion of reproduced image even when an incidence angle varies, and also can prevent irregular reflection from a reflective film of an optical recording medium due to informing light and reference light and prevents the occurrence of noises; and a hologram type optical recording medium capable of a high density recording using the filter for optical recording media.

The chiral agent for liquid crystal according to the present invention can impart a high twisting power and is excellent in compatibility with a liquid crystal compound, and can be preferably used for a filter for optical recording media.

The liquid crystal composition and the polymer according to the present invention can provide hue having high color purity and there can be preferably used to form a liquid crystal color filter, or optical films such as a circularly polarized light separating film, glasses for stereoscopic vision, a polarized light mask, or a filter for optical recording media.

The optical recording medium filter according to the present invention causes neither deviation of a selective reflected wavelength nor distortion of reproduced image even when an incidence angle varies, and also can prevent irregular reflection from a reflective film of an optical recording medium due to informing light and reference light and prevents the occurrence of noises, and therefore can be preferably used for an optical recording medium.

The optical recording medium according to the present invention uses the filter for optical recording media and can provide hologram type optical recording medium capable of a high density recording which has never been attained.

The liquid crystal color filter according to the present invention can increase a twisting power (twisting angle) of a liquid crystal by using the chiral agent for liquid crystal and therefore can also enhance color purity of three primary colors of blue (B), green (G) and red (R) and can provide a highly fine liquid crystal color filter.

What is claimed is:
1. A liquid crystal composition, comprising a chiral agent used for liquid crystal and a liquid crystalline compound,
wherein the chiral agent used for liquid crystal comprises a phosphoric acid amide represented by General Formula (1) below:

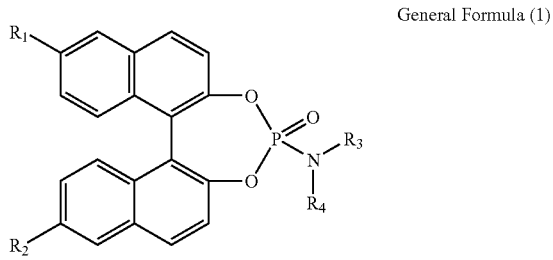

General Formula (1)

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

2. The liquid crystal composition according to claim 1, further comprising a photopolymerization initiator.

3. The liquid crystal composition according to claim 1, wherein the liquid crystalline compound comprises at least a polymerizable group.

4. The liquid crystal composition according to claim 3, wherein the polymerizable group is an ethylenic double bond.

5. A polymer produced by way of polymerizing a liquid crystal composition,
   wherein the liquid crystal composition comprises a chiral agent used for liquid crystal and a liquid crystalline compound, and
   the chiral agent used for liquid crystal comprises a phosphoric acid amide represented by General Formula (1) below:

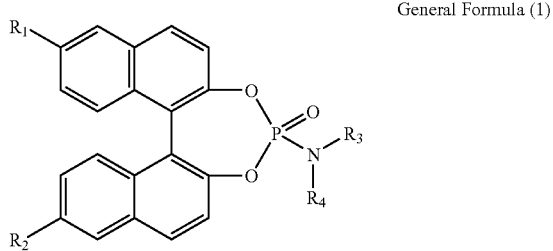

General Formula (1)

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_1$ may be identical or different and each represents a hydrogen atom, an alkyl group or an aryl group.

6. The polymer according to claim 5, which is a cholesteric liquid crystal polymer.

7. A filter used for optical recording media, comprising a polymer produced by way of polymerizing a liquid crystal composition,
   wherein the liquid crystal composition comprises a chiral agent used for liquid crystal and a liquid crystalline compound, and
   the chiral agent used for liquid crystal comprises a phosphoric acid amide represented by General Formula (1) below:

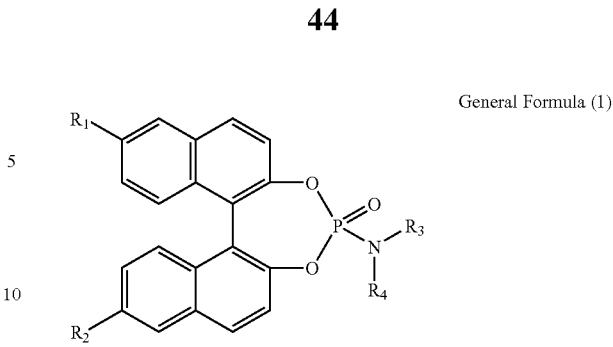

General Formula (1)

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

8. An optical recording medium, comprising a filter used for optical recording media that comprises a polymer produced by way of polymerizing a liquid crystal composition,
   wherein the liquid crystal composition comprises a chiral agent used for liquid crystal and a liquid crystalline compound, and
   the chiral agent used for liquid crystal comprises a phosphoric acid amide represented by General Formula (1) below:

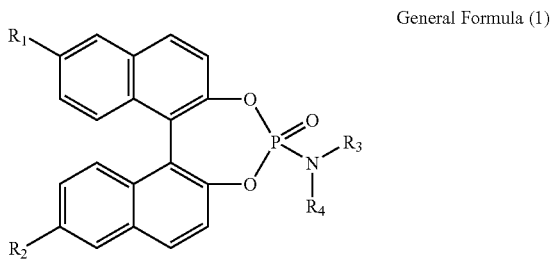

General Formula (1)

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

9. The optical recording medium according to claim 8, which comprises:
   a first substrate,
   a second substrate,
   a recording layer which records information on the second substrate by use of holography, and
   a filter used for optical recording media between the second substrate and the recording layer,
   wherein the filter used for optical recording media comprises a polymer produced by way of polymerizing a liquid crystal composition,
   the liquid crystal composition comprises a chiral agent used for liquid crystal and a liquid crystalline compound, and the chiral agent used for liquid crystal comprises a phosphoric acid amide represented by General Formula (1) below:

General Formula (1)

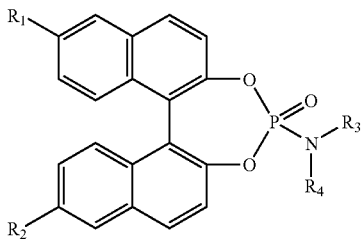

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

10. A color filter for liquid crystal, comprising a chiral agent for liquid crystal that comprises a phosphoric acid amide represented by General Formula (1) below:

General Formula (1)

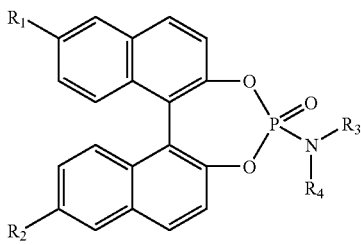

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

11. A color filter for liquid crystal, comprising a polymer produced by way of polymerizing a liquid crystal composition, wherein the liquid crystal composition comprises a chiral agent used for liquid crystal and a liquid crystalline compound, and the chiral agent used for liquid crystal comprises a phosphoric acid amide represented by General Formula (1) below:

General Formula (1)

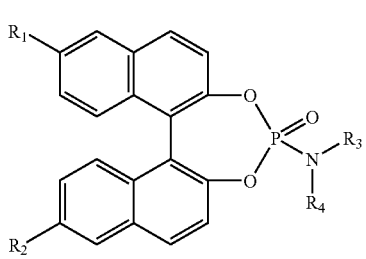

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

12. An optical filter, comprising a chiral agent for liquid crystal that comprises a phosphoric acid amide represented by General Formula (1) below:

General Formula (1)

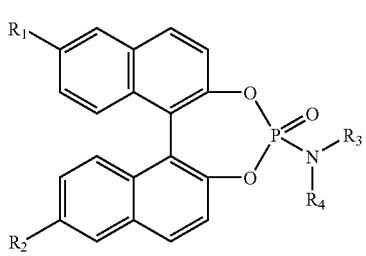

in General Formula (1), the binaphthyl structure has an axial asymmetry of either (R) or (S); $R_1$ and $R_2$ may be identical or different and each represents a hydrogen atom, a halogen atom, an alkyl group, an aryl group, an alkenyl group, an alkynyl group or an alkoxy group; $R_3$ and $R_4$ may be identical or different and each represents a hydrogen atom, an alkyl group or an aryl group.

* * * * *